United States Patent Office 3,477,924
Patented Nov. 11, 1969

3,477,924
COATING PROCESS
Razmic S. Gregorian, Silver Spring, and Richard W. Bush, Laurel, Md., assignors to W. R. Grace & Co., New York, N.Y., a corporation of Connecticut
No Drawing. Continuation-in-part of application Ser. No. 625,935, Mar. 27, 1967. This application Apr. 24, 1967, Ser. No. 632,945
Int. Cl. B01k 1/00; C07b 3/00
U.S. Cl. 204—78                                   6 Claims

ABSTRACT OF THE DISCLOSURE

A process for forming a polyarylene oxide by electropolymerization which comprises maintaining an electric potential between electrodes immersed in a basic aqueous solution of a hydroxylated aromatic compound. The polymer, if desired, can be recovered as a coating on the anode.

---

This application is a continuation-in-part of our co-pending application having Ser. No. 625,935 filed Mar. 27, 1967, now abandoned.

Processes for oxidizing phenols to polyphenol ethers are well known in the art. However, the polymer formed by such processes is generally formed in the presence of specific catalyst. See for example U.S. 3,219,625.

One object of the instant invention is to form a polyarylene oxide by electropolymerization of a hydroxylated aromatic compound. Another object is to form a polyarylene oxide coating on the anode surface of an electrolytic cell. Other objects will be obvious from a reading hereinafter.

In summary, the invention consists of an electropolymerization process for forming polyarylene oxide which comprises maintaining a DC electric potential between electrodes immersed in a basic aqueous solution of a hydroxylated aromatic compound and recovering polyarylene oxide. The polymer can, if desired, be recovered as a coating on the anode.

As used herein the term "hydroxylated aromatic" is any compound in which at least one hydroxyl group is directly attached to at least one aromatic ring. Non-interfering groups such as alkyl, aryl, aralkyl, Cl, etc. may be substituted on the ring without departing from this invention. Thus, hydroxylated aromatic compounds which are operable in the instant invention include, but are not limited to, phenol alpha-naphthol, beta-naphthol, 1-hydroxyanthracene, 1,3-dihydroxylbenzene, ortho-cresol, 2-chlorophenol, and 2,6-dimethyl phenol. In the event that more than one hydroxyl group is attached to a single aromatic ring, the groups should preferably not be para to each other. Para substitution may result in electrolytic oxidation of the hydroxylated aromatic to a quinoid compound rather than an electropolymerization to the desired polyarylene oxide. For purposes of explanation and simplicity, the invention will be explained using phenol as the monomer to be polymerized.

In the instant invention the electrolytic apparatus can be any conventional electrolytic cell, e.g. the H or U type compartment cell or standard non-compartmented cell employing a source of DC voltage.

Any metallic or non-metallic material which is electroconductive is operable as electrodes in the instant invention. Thus operable materials include, but are not limited to, Pt, Pd, Sn, Pb, V, Cr, Ti, W, Au, Bi, Ni, Al, Fe, steel and alloyed steel, C, Ag, Co, Mn, Zr, Ge, Zn and the like.

The amount of hydroxylated aromatic compound dissolved in the aqueous basic bath is dependent upon the individual hydroxylated aromatic compound, pH and the temperature of the bath. For example, for phenol at room temperature an amount sufficient to give a 0.05 to 2 molar solution, preferably 0.5 to 1.5 molar is operable.

The process of the instant invention is usually performed at temperatures in the range from 0° C. up to the boiling point of the solution preferably at room temperature, i.e. 20 to 30° C. Ambient conditions of pressure are usually employed although superatmospheric pressures are operable.

The reaction can be carried out for varying periods of time ranging from 5 seconds to 50 hours, preferably 10 to 60 minutes.

During the electropolymerization reaction, a potential difference in the range 0.5–500 volts, preferably 25–250 volts, is maintained between the electrodes.

The process of the instant invention is carried out at a current density in the range 0.01 to 65 milliamps/cm.$^2$, preferably in the range 2–10 milliamps/cm.$^2$.

The amount of base added to the aqueous bath is that which is sufficient to allow the hydroxylated aromatic compound to dissolve. If coating of the anode is desired, care should be exercised that excess amounts of base are not added to the system since little or no coating occurs at higher base concentrations.

The reaction mechanism by which the electropolymerization is believed to occur is as follows, using phenol as an example.

Phenoxide ion, formed by reaction of phenol and base, migrates to the anode under the influence of the electric potential and there loses an electron to form a phenoxy radical which reacts with other phenoxy radicals and/or phenoxide ions to form a polyphenylene oxide.

The following examples are set out not to limit, but to better understand, the instant invention.

In all examples, unless otherwise noted, the electrolytic cell used was a modified U-shaped tube with the anodic and cathodic compartments separated by an ion-permeable, sintered glass disc. The anode compartment was designed for maintaining an inert atmosphere, e.g. argon gas. However, it should be understood that an inert atmosphere is not necessary in performing the instant invention and ambient conditions can be employed. Stirring in the anode compartment was controlled by the flow of the inert gas into the compartment. Electrode support rods enter the cell through ground glass joints with a piece of "Tygon" tubing on each support rod to regulate the height of the electrodes in the solution. Unless otherwise noted, the area of each electrode immersed in the solution was 25.0 cm.$^2$. The cell was placed in a constant temperature bath (23° C.) and connected to a DC power supply provided by a Westinghouse Power Pack, style 47A9968G19, with a generating capacity of 6 amperes and 125 volts direct current. Unless otherwise noted the cathode was platinum metal, whereas various metals were used as the anode as will be shown in the examples.

Example 1

The polymerization was conducted in a 2-compartment glass cell (modified U-shaped tube) having 100 ml. capacity in each compartment. The compartments were separated by an ion-permeable, sintered glass disc. The cell was placed in a water bath maintained at 23° C. and the current was provided by a Westinghouse Power Pack with a generating capacity of 6 amperes and 125 volts direct current.

In the anode compartment were placed 100 ml. of an aqueous solution containing 9.41 g. (0.1 mole) of phenol and 0.40 g. (0.01 mole) of sodium hydroxide. In the cathode compartment was placed an equivalent level of 0.1 M sodium hydroxide. The anode was a weighed iron sheet having an immersed portion 2.5 cm. x 5.0 cm. or 25 cm.$^2$ of surface. The cathode was a platinum electrode having approximately the same immersed surface.

A stream of argon was passed at 10 ml./min. through a glass frit immersed in the anolyte below the level of the anode to dislodge oxygen gas formed thereon by electrolysis.

The voltage was set at 35 volts so as to give an initial current of 100 milliamperes (4.0 ma./cm.$^2$ or 3.72 amperes/ft.$^2$ current density). After 12 minutes, the current began to decrease at constant voltage and after 21 minutes the current leveled off at about 40 ma. The current was stopped after 30 minutes. The iron anode had a uniform reddish coating of polyphenylene oxide and was washed, dried and weighed. The increase in weight was 0.007 g. for a calculated coating thickness of 2.5 microns or 0.1 mil. The polymer coating was insoluble in hydrochloric acid and left no residue upon ignition showing that it was not iron oxide.

The example was repeated except that the electropolymerization was carried out for 60 minutes. The polymer on the anode weighed 0.009 g. An infrared spectrum of the polymer showed aromatic skeletal bands at about 1500 and 1600 cm.$^{-1}$, an aromatic ether band at 1200 cm.$^{-1}$ and parasubstitution at 825 cm.$^{-1}$. The hydroxyl band was absent.

The following examples in Table I show the effect of varying the voltage on the amount of polymer coating deposited on the anode. In all examples the procedure was the same as in Example 1 under the conditions stated in Table I. The cathode was made of platinum and both the anode and cathode had an immersed area of 25 cm.$^2$. In the anode compartment was placed 100 ml. of an aqueous solution containing 9.41 g. (0.1 mole) of phenol and 0.40 g. (0.01 mole) of sodium hydroxide. In the cathode compartment was placed an equivalent level of 0.1 M sodium hydroxide.

TABLE I

| Example No. | Anode | Polymerization Time (min.) | D.C. Voltage (volts) | Current (ma.) Initial | Current (ma.) Final | Polymer Coating Wgt. (mg.) |
|---|---|---|---|---|---|---|
| 2 | Fe | 30 | 100 | 300 | 92 | 20 |
| 3 | Fe | 30 | 8 | 15 | 9 | 1 |

As can be seen from the results in Table I the increased voltage resulted in an increased amount of polymer.

The following examples in Table II show the effect of varying the polymerization time and the concentration of the monomer in the solution. In all examples, platinum was used as the cathode and iron was used as the anode, and both anode and cathode were immersed to a surface area of 25.0 cm.$^2$. In all examples in Table II the cathode compartment was filled with sodium hydroxide of the same molarity as in the anode compartment. The voltage was set at 35 volts so as to give an initial current of 100 milliamperes. The procedure was as in Example 1.

TABLE II

| Example No. | Anolyte Phenol (molar) | Anolyte NaOH (molar) | Polymerization Time (min.) | Final Current (ma.) | Polymer Coating Wgt. (mg.) |
|---|---|---|---|---|---|
| 4 | 1.0 | 0.1 | 30 | 35 | 7 |
| 5 | 1.0 | 0.1 | 60 | 24 | 9 |
| 6 | 2.0 | 2.0 | 30 | 85 | 2 |

The following examples in Table III show various metals which are operable as anodes for the polymerization in the instant invention. In all the examples in Table III the cathode was platinum, and both the anode and cathode were immersed to a surface area of 25 cm.$^2$. In the anode compartment was placed 100 ml. of an aqueous solution containing 9.41 g. (0.1 mole) of phenol and 0.40 g. (0.01 mole) of sodium hydroxide. In the cathode compartment was placed an equivalent level of 0.1 M sodium hydroxide. The voltage was set so as to give an initial current of 100 milliamperes.

TABLE III

| Example No.: | Anode | Polymerization Time (min.) | Final Current (ma.) | Polymer Coating Wgt. (mg.) |
|---|---|---|---|---|
| 7 | Nickel | 30 | 23 | 16 |
| 8 | Copper | 30 | 10 | 9 |
| 9 | Titanium | 30 | 35 | 1 |
| 10 | Tin | 30 | 100 | 8 |
| 11 | Cadmium | 30 | 100 | 9 |
| 12 | Lead | 30 | 40 | 8 |

The polymerization process of the instant invention is useful in coating various metals to protect them from abrasion, corrosion and oxidation. Thus it is possible by the instant invention to coat cans used in the food and beverage industries and other metal objects.

What is claimed is:

1. A process for forming polyarylene oxide which consists essentially of maintaining an electric potential in the range 0.5–500 volts at a current density in the range 0.01 to 65 milliamps/cm.$^2$ between electrodes immersed in a basic aqueous solution of a hydroxylated aromatic compound at a temperature in a range 20–30° C.

2. The process according to claim 1 wherein the hydroxylated aromatic compound is phenol.

3. The process according to claim 1 wherein it is preformed at superatmospheric pressure.

4. The process for forming a polyarylene oxide coating on the anodic surface of electrolytic cell which consists essentially of maintaining an electric potential in the range 0.5–500 volts at a current density in the range 0.01 to 65 milliamps/cm.$^2$ between electrodes immersed in a basic solution of a hydroxylated aromatic compound maintained at a temperature in the range 20–30° C. and recovering polyarylene oxide as a coating on the anodic electrode.

5. The process according to claim 4 wherein the hydroxylated aromatic compound is phenol.

6. The process according to claim 4 wherein the polymerization is carried out at superatmospheric pressure.

References Cited

UNITED STATES PATENTS 2,961,384  11/1960  McKinney et al. _____ 204—59 XR
3,335,075  8/1967  Borman _____ 204—72 XR PATRICK P. GARVIN, Primary Examiner U.S. Cl. X.R.

204—14